United States Patent Office 3,057,828
Patented Oct. 9, 1962

3,057,828
PREPARATION OF POLYESTERS FROM DIALKYL TEREPHTHALATES USING DIVALENT ANTIMONITES AS CATALYSTS
Harry D. McNeil, Jr., Kennett Square, Pa., assignor to Hercules Powder Company, Wilmington, Del., a corporation of Delaware
No Drawing. Filed Jan. 18, 1960, Ser. No. 2,800
7 Claims. (Cl. 260—75)

This invention relates to an improved method for preparing synthetic linear polyesters.

The production of film- and fiber-forming linear polyesters of terephthalic acid and alkylene glycol of the series $$HO(CH_2)_nOH$$

where $n$ is an integer from 2 to 10, has been described many times in the art. From a commercial standpoint, probably the most attractive polymer of the above class is poly(ethylene terephthalate) and the most widely used process for its production comprises carrying out an ester interchange between ethylene glycol and dimethyl terephthalate and then polymerizing the resultant glycol terephthalate by splitting off ethylene glycol under reduced pressure at an elevated temperature.

It has long been recognized that in order to obtain a satisfactory rate of reaction in both the aforesaid ester interchange and polymerization, it is necessary to employ a catalyst, and numerous catalysts for this purpose have been proposed. Many of the proposed catalysts are effective in the ester interchange reaction and many of them catalyze the polymerization reaction. However, as a general rule, very few, if any, of the catalysts are effective enough in both reactions to enable their use to the exclusion of other catalysts.

While, as aforesaid, numerous catalysts have been proposed, some of which are effective primarily as ester interchange catalysts and some primarily effective as polymerization catalysts, the art still encounters difficulty in preparing polyesters of satisfactory molecular weight and color in a reasonable length of time. Many catalysts, for instance, promote fast reactions but their use results either in a polymer of too low molecular weight, too low melting point or unsatisfactory color. It is indeed difficult to obtain both satisfactory color and molecular weight in the short periods of time that are desirable for commercial operation.

Most frequently mentioned in the art as catalysts for the aforesaid polymerization reaction are compounds of antimony. Among the antimony compounds, antimony oxide, $Sb_2O_3$, has received the most attention and is considered outstanding. Antimony oxide, however, is not a very effective catalyst for the ester interchange and therefore its use as a polymerization catalyst is normally supplemented by the use of another material to catalyze the ester interchange.

In accordance with the present invention it has been found that divalent metal antimonites are particularly valuable catalysts for use in the preparation of high molecular weight polyesters of terephthalic acid and an alkylene glycol. Compared to other antimony compounds in general these metal antimonites are advantageous catalysts from two standpoints: (1) most of them are capable of serving both as ester interchange and polymerization catalysts, and (2) their use leads to polymers of exceptionally good color.

In accordance with the above discovery the invention is directed to an improvement in the process of producing poly(alkylene terephthalates) wherein an alkylene glycol of 2 to 10 carbon atoms is reacted under ester interchange conditions with a lower dialkylterephthalate and the resulting glycol terephthalate is polymerized by splitting off of glycol, which improvement comprises carrying out the ester interchange and polymerization in the presence of a catalytic amount of a divalent metal antimonite.

With the exception of stannous antimonite, no catalyst other than one of the specified metal antimonites is necessary in the practice of the invention but this is not intended to preclude the employment of one or more additional materials either to promote the ester interchange or the polymerization or as additives for some other purpose. In fact, it may sometimes be desirable to employ an auxiliary ester interchange catalyst and in some cases it may be desirable to employ an additive such as an organic phosphite to assist in obtaining a polymer of optimum color.

The metal antimonites used as catalysts in the invention are simple compounds that can be prepared by simply fusing the appropriate metal oxide (MO) with antimony oxide in an inert atmosphere in stoichiometric proportion at a temperature of about 450–700° C., viz., the following reaction:

$$MO + Sb_2O_3 \rightarrow M(SbO_2)_2$$

The following examples are presented as illustrative of the invention. Parts and percentages are by weight unless otherwise specified. Intrinsic viscosity in the examples was determined at 25° C. on a 1% solution of polymer in a 60:40 weight blend of phenol and tetrachloroethane. Percentage of catalyst is based on the quantity of dimethylterephthalate initially present.

EXAMPLES 1–10

*General Procedure for Preparation of Polymer*

All polymers in these examples were prepared by placing 436.5 parts of dimethylterephthalate, 251 parts of ethylene glycol, and predetermined amounts of catalysts into a reaction vessel equipped with a distillation column and agitator. The mixture of reactants and catalyst is then heated under agitation and ester interchange begins to take place when the temperature within the reaction vessel reaches about 135°–200° C. Distillation of methanol from the vessel takes place rapidly as the temperature is increased gradually to maintain the rate of methanol evolution. Finally, when the reaction temperature has reached about 230°–245° C. and the theoretical quantity of methanol has been evolved and collected, the reaction is terminated by cooling to 200° C. and pouring the resulting glycol terephthalate from the reaction vessel. The glycol terephthalate product in all cases consists essentially of bis(hydroxyethyl)terephthalate and low molecular weight products of this compound having an average degree of polymerization of less than 4.

Next, the ester interchange product is placed in a vacuum reactor provided with a nitrogen sparge and an evacuation outlet. The ester interchange product is heated over a period of about ½ hour to its melting point (about 200° C) and nitrogen sparge is started while reducing the pressure over this period of time to about 13–30 mm. Hg. The reactor is then further evacuated gradually to about one mm. Hg while the temperature is increased to 285° C. over a period of about 1–1.5 hours and the temperature held at this last point while maintaining a pressure of 0.1 to 1.5 mm. Hg until the desired intrinsic viscosity is reached.

The quality of the polymer is determined by measuring its intrinsic viscosity, birefringent melting point and color. Color determinations were made in two ways, by visual observation and, on some of the polymers, by measuring the percent reflectance and excitation purity at dominant wave length (m$\mu$) of a disk of the polymer by means of a General Electric spectrophotometer. In the latter measurement all polymers exhibited a dominant wave length of 565–580 m$\mu$. By visual observation of the polymer, it is assigned a rating from 1 to 5, a rating of 1 representing a pure white polymer and a rating of 5 representing a polymer that has a marked yellow color.

The results of several experiments comparing the process of the invention with processes outside the invention are presented tabularly as follows:

TABLE I.—ESTER INTERCHANGE

| Example No. | Catalyst | Percent Catalyst | Time (hrs.) | Temp. Range (° C.) |
|---|---|---|---|---|
| 1 | $Mg(SbO_2)_2$ | 0.02 | 11.0 | 195–240 |
| 1A | MgO / $Sb_2O_3$ | 0.00242 / 0.0175 | 11.75 | 190–240 |
| 2 | Mn Acetate / $Sn(SbO_2)_2$ | 0.01 / 0.02 | 8.0 | 175–235 |
| 2A | Mn Acetate / $Sb_2O_3$ | 0.01 / 0.02 | 6.95 | 164–237 |
| 2B | Mn Acetate / SnO / $Sb_2O_3$ | 0.01 / 0.00632 / 0.0137 | 6.75 | 192–242 |
| 3 | $Mg(SbO_2)_2$ / $Sn(SbO_2)_2$ | 0.02 / 0.02 | 11.75 | 180–240 |
| 3A | MgO / SnO / $Sb_2O_3$ | 0.00242 / 0.0063 / 0.0311 | 8.8 | 182–232 |
| 4 | Mg Acetate / $Sn(SbO_2)_2$ | 0.01 / 0.02 | 10.0 | 190–240 |
| 4A | Mg Acetate / SnO / $Sb_2O_3$ | 0.01 / 0.00632 / 0.0137 | 11.0 | 188–240 |
| 5 | Mn Acetate / $Mn(SbO_2)_2$ | 0.01 / 0.02 | 6.38 | 176–235 |
| 5A | Mn Acetate / MnO / $Sb_2O_3$ | 0.01 / 0.00396 / 0.01605 | 5.5 | 180–238 |
| 6 | $Mn(SbO_2)_2$ | 0.02 | 7.3 | 194–236 |
| 6A | MnO / $Sb_2O_3$ | 0.0039 / 0.0160 | 6.5 | 185–240 |
| 7 | $Pb(SbO_2)_2$ / TPP[1] | 0.02 / 0.01 | 3.5 | 185–236 |
| 7A | PbO / $Sb_2O_3$ / TPP[1] | 0.0087 / 0.0113 / 0.01 | 3.5 | 175–235 |
| 8 | $Cd(SbO_2)_2$ | 0.02 | 12.5 | 165–240 |
| 8A | CdO / $Sb_2O_3$ | 0.0061 / 0.0138 | 8.75 | 170–238 |
| 9 | Mn Acetate / $Mg(SbO_2)_2$ | 0.01 / 0.02 | 12.0 | 165–240 |
| 9A | Mn Acetate / $Sb_2O_3$ | 0.01 / 0.02 | 6.95 | 164–237 |
| 10 | $Mg(SbO_2)_2$ / TPP[1] | 0.02 / 0.01 | 11.75 | 195–250 |

[1] TPP = triphenylphosphite.

TABLE II.—POLYMERIZATION

| Example No. | Temp. Range (° C.) | Pressure (mm. Hg) | Heat-Up (hrs.) | Time at 285° C. (hrs.) |
|---|---|---|---|---|
| 1 | 282–288 | 0.45–0.65 | 0.9 | 2.3 |
| 1A | 283–288 | 0.40–0.85 | 2.0 | 1.92 |
| 2 | 282–288 | 0.43–0.65 | 1.0 | 2.5 |
| 2A | 286–288 | 0.58–0.80 | 5.33 | 0.417 |
| 2B | 284–288 | 0.55–0.70 | 0.75 | 2.1 |
| 3 | 284–289 | 0.60–0.65 | 2.25 | 1.5 |
| 3A | 286–290 | 0.45–0.90 | 1.92 | 1.08 |
| 4 | 284–287 | 0.40–0.75 | 1.88 | 2.0 |
| 4A | 282–290 | 0.65–0.98 | 1.83 | 1.3 |
| 5 | 282–288 | 1.35–2.50 | 1.75 | 2.25 |
| 5A | 285–290 | 0.9 | 1.92 | 1.5 |
| 6 | 285 | 0.55–0.70 | 1.42 | 2.92 |
| 6A | 285 | 0.20–0.40 | 1.58 | 3.0 |
| 7 | 285 | 0.40–0.55 | 1.42 | 3.0 |
| 7A | 285 | 0.4–0.6 | 1.25 | 3.0 |
| 8 | 286–290 | 0.5–0.75 | 4.5 | 0.5 |
| 8A | 284–290 | 0.45–0.50 | 3.17 | 1.0 |
| 9 | 284–289 | 0.45–0.90 | 1.88 | 1.5 |
| 9A | 286–288 | 0.58–0.80 | 5.33 | 0.417 |
| 10 | 284–288 | 0.40–0.60 | 2.5 | 4.0 |

TABLE III.—POLYMER PROPERTIES

| Example No. | Catalyst | I.V.[1] | Melting Point (° C.) | Visual Color Rating | Percent Reflectance | Excitation Purity (Percent) | Dominant Wave Length (m$\mu$) |
|---|---|---|---|---|---|---|---|
| 1 | $Mg(SbO_2)_2$ | 0.66 | 266 | 1 | 79.5 | <2 | [2] Ind. |
| 1A | MgO / $Sb_2O_3$ | 0.69 | 262 | 3 | 78.0 | 2.4 | 570 |
| 2 | Mn Acetate / $Sn(SbO_2)_2$ | 0.57 | 265 | 1 | 83.7 | <2 | [2] Ind. |
| 2A | Mn Acetate / $Sb_2O_3$ | 0.69 | 262 | 5 | — | — | — |
| 2B | Mn Acetate / SnO / $Sb_2O_3$ | 0.67 | 263 | 3 | 81.7 | 2.5 | 580 |
| 3 | $Mg(SbO_2)_2$ / $Sn(SbO_2)_2$ | 0.63 | 265 | 1 | 83.7 | <2 | [2] Ind. |
| 3A | MgO / SnO / $Sb_2O_3$ | 0.70 | 263 | 5 | 72.5 | 8.1 | 578 |
| 4 | Mg Acetate / $Sn(SbO_2)_2$ | 0.69 | 265 | 3 | 80.0 | 2.8 | 570 |
| 4A | Mg Acetate / SnO / $Sb_2O_3$ | 0.59 | 262 | 5 | 68.2 | 11.9 | 578 |
| 5 | Mn Acetate / $Mn(SbO_2)_2$ | 0.58 | — | 3 | 84.5 | 3.2 | 570 |
| 5A | Mn Acetate / MnO / $Sb_2O_3$ | 0.66 | — | 4 | 77.5 | 4.5 | 573 |
| 6 | $Mn(SbO_2)_2$ | — | — | 1 | — | — | — |
| 6A | MnO / $Sb_2O_3$ | — | — | 3 | — | — | — |
| 7 | $Pb(SbO_2)_2$ / TPP[3] | 0.65 | 266 | 3 | — | — | — |
| 7A | PbO / $Sb_2O_3$ / TPP[3] | 0.67 | 266 | 4 | — | — | — |
| 8 | $Cd(SbO_2)_2$ | 0.61 | 263 | 2 | — | — | — |
| 8A | CdO / $Sb_2O_3$ | 0.63 | 264 | 3 | — | — | — |
| 9 | Mn Acetate / $Mg(SbO_2)_2$ | 0.65 | 265 | 2 | 80 | 3.2 | 571 |
| 9A | Mn Acetate / $Sb_2O_3$ | 0.69 | 262 | 5 | — | — | — |
| 10 | $Mg(SbO_2)_2$ / TPP[3] | 0.63 | 265 | 1 | 70 | 2.0 | 569 |

[1] Intrinsic viscosity.
[2] Indeterminate.
[3] Triphenylphosphite.
Dashes indicate data not determined.

In explanation of the tables, the numbered Examples 1–10 are illustrative of the invention. Those examples in which the number is followed by a letter, e.g., 1A, 2A, etc., are illustrative of processes outside the scope of the invention and are presented for purposes of comparison. It is seen that in every comparison, such as by comparing Examples 1 and 1A, the process of the invention leads to a polymer of better color than does the comparative example. The data thus show that the use of antimony in the form of the antimonite radical is highly advantageous. It should be noted, for instance, that each antimonite is a better catalyst from the standpoint of polymer color than the combination of ingredients from which the antimonite is prepared. The cation of the antimonite catalyst does, of course, have an effect on the efficiency and performance of the catalyst but this effect is subordinate to that of the antimonite radical. Thus, for instance, the use of a given metal antimonite yields a polymer of better color than the combination of another compound of the same metal and another compound of antimony under comparable conditions.

EXAMPLE 11

Into a reaction vessel equipped with a distillation column and agitator there was placed 436.5 parts of dimethyl terephthalate, 251.1 parts of ethylene glycol, 0.63 part of calcium acetate and 0.05 part of stannous antimonite [$Sn(SbO_2)_2$]. This mixture of reactants was then heated under agitation and ester interchange began to take place when the temperature inside the reaction vessel reached about 135° C. Distillation of methanol from the vessel took place rapidly and as the reaction progressed the temperature was increased gradually to maintain the rate of methanol evolution. Finally after a period of about 2 hours the reaction temperature reached 231° C., at which time 137 parts of methanol had been evolved and collected. The water white product of ester interchange, consisting essentially of bis(hydroxy ethyl terephthalate) and low molecular weight polymers of this compound having an average degree of polymerization of less than 4, was then cooled to 200° C. and poured from the vessel.

Next, 15 parts of the ester interchange product was placed in a sealed vertical tubular reactor provided with a nitrogen sparge and an evacuation outlet. While reducing the pressure to 13 mm. Hg the ester interchange product was heated over a period of ½ hour to its melting point (about 200° C.) and the nitrogen sparge was started. The reactor was further evacuated gradually to a pressure of about 1 mm. Hg. The temperature was next increased to 285° C. over a period of 1.5 hours and the temperature held at this last point for 1.5 hours, while maintaining a pressure of 3.6–3.9 mm. Hg. The resulting viscous polymer melt was allowed to cool under reduced pressure while continuing to sparge with nitrogen.

The final polymer upon removal from the reactor had an intrinsic viscosity of 0.57 and a birefringent melting point of about 263° C. The solidified polymer was almost pure white.

EXAMPLE 12

Into a reaction vessel equipped with a distillation column and agitator there was placed 436.5 parts of dimethyl terephthalate, 251.1 parts of ethylene glycol, 0.63 part of barium acetate and 0.1 part of $Sn(SbO_2)_2$. This mixture of reactants was then heated under agitation and ester interchange began to take place when the temperature inside the reaction vessel reached about 150° C. Distillation of methanol from the vessel took place rapidly and as the reaction progressed the temperature was increased gradually to maintain the rate of methanol evolution. Finally after a period of 3.35 hours the reaction temperature reached 238° C., at which time 137 parts of methanol had been evolved and collected. The water white product of ester interchange, consisting essentially of bis(hydroxy ethyl terephthalate) and low molecular weight polymers of this compound having an average degree of polymerization of less than 4, was then cooled to 200° C. and poured from the vessel.

Next 15 parts of the ester interchange product was placed in a sealed vertical tubular reactor provided with a nitrogen sparge and an evacuation outlet. While reducing the pressure to 13 mm. Hg the ester interchange product was heated over a period of one-half hour to its melting point (about 200° C.) and the nitrogen sparge was started. The reactor was further evacuated gradually to a pressure of about 1 mm. Hg. The temperature was next increased to 285° C. over a period of 1.5 hours and the temperature held at this last point for 3.75 hours, while maintaining a pressure of 2.8 mm. Hg. The resulting viscous polymer melt was allowed to cool to room temperature at 3.6 mm. Hg pressure with nitrogen sparge until solidification took place.

The final polymer upon removal from the reactor had an intrinsic viscosity of 0.664 and a birefringent melting point of 266° C. The solidified polymer was essentially pure white.

The process of the invention is characterized by reacting a dialkyl terephthalate and an alkylene glycol under ester interchange conditions and then polymerizing the resulting glycol terephthalate by splitting off of glycol to form a high molecular weight linear polyester in the presence throughout of a catalytic amount of a divalent metal antimonite. The examples have illustrated the use of antimonites of cadmium, tin, magnesium, manganese, and lead but the dominant tendency of the antimonite radical to form high quality polymers is noticeable with any other divalent antimonite, for example, those of beryllium, calcium, strontium, barium, zinc, mercury, iron, cobalt, nickel, copper, chromium and all other metals that form divalent antimonites. The common quality of each of these catalysts is, of course, the ability to give lighter colored polymers than when another form of antimony is used in combination with the same divalent metal.

The distinguishing feature of the invention is the employment of the specified antimonite catalyst; other details of the process are as already known to the art. Typically, the initial ester interchange can be conveniently carried out by reacting the terephthalate esters and glycol in molar proportions of about 0.25 to 0.7 mole of the former to each mole of the latter at atmospheric pressure at a temperature between 100° and 260° C., preferably between 135°–235° C. It may also be carried out at pressures above and below atmospheric pressure if desired.

The product from the ester interchange is conventionally a mixture of bis(hydroxyalkyl terephthalate) and low molecular polymers of this compound having an average degree of polymerization of less than 4, such products being commonly defined in the art as "glycol terephthalate."

As is also conventional in the art, polymerization of the ester interchange product is effected in the liquid phase at a reduced pressure in the vicinity of 0.05–20 mm. Hg, more preferably within the range of 0.5–5 mm. Hg, for optimum results, a reduced pressure being required to remove glycol which is split off as a result of condensation. A temperature between 230°–290° C. is desirable and should be maintained during the polymerization which is carried out until a polymer of desired molecular weight is obtained.

While dimethyl terephthalate and ethylene glycol are the preferred starting materials for the practice of the invention, other dialkyl terephthalates in which the alkyl groups contain not more than 4 carbon atoms, e.g., diethyl, di-n-propyl and di-n-butyl terephthalates can be used and likewise alkylene glycols having up to 10 carbon atoms can be employed. These are the essential reactants but it is not intended to exclude other modifying reactants such as dialkyl ortho- and isophthalates and the like since these can be employed to replace a part of the dialkyl terephthalate to effect a slight to moderate alteration of final polymer properties. Also, other glycols, such as butanediol-1,4, octanediol-1,8, etc., that contain up to 10 carbon atoms can be used in place of ethylene glycol.

From the standpoint of accelerating the reactions involved, the amount of catalyst is not an important factor. However, it is desirable to keep the amount of catalyst as low as possible in order to achieve optimum color. With these considerations in mind, the total amount of catalyst employed in the invention should be less than about 0.5% of the combined weight of starting reactants, preferably from 0.1 to 0.025%. As already explained, the total catalyst need not consist entirely of one of the specified antimonite compounds but may be a mixture of one or more other catalysts and one or more of the antimonite compounds. In such case, the presence of at least 0.005% of antimonite compound based on the weight of reactants is essential to obtain the advantages of the invention. Although in some cases the use of other auxiliary catalysts in conjunction with the antimonite compound may lead to polymers of poorer color than obtained with the use of the antimonite compound alone, the color of such polymers will nevertheless be better than is obtainable when the same auxiliary catalysts are used in conjunction with other antimony compounds. However, all of the divalent metal antimonites except stannous antimonite are capable of catalyzing both ester interchange and polymerization and hence require no auxiliary catalysts. In the case of stannous antimonite an auxiliary ester interchange catalyst is desirable.

This application is a continuation-in-part of my prior applications Serial No. 794,250, filed February 19, 1959, and Serial No. 799,116, filed March 13, 1959, now abandoned.

What I claim and desire to protect by Letters Patent is:

1. In the process for producing high molecular weight film- and fiber-forming polyesters wherein an alkylene glycol having from 2 to 10 carbon atoms is reacted under ester interchange conditions with a lower dialkyl terephthalate and the resulting glycol terephthalate is polymerized by splitting off to glycol, the improvement which comprises carrying out the ester interchange and polymerization in the presence of a catalytic amount from about 0.005% to about 0.5% based on the combined weight of the reactants of a divalent metal antimonite selected from the group consisting of the antimonites of cadmium, tin, magnesium, manganese, lead, beryllium, calcium, strontium, barium, zinc, mercury, iron, cobalt, nickel, copper, chromium, and mixtures thereof.

2. The process of claim 1 wherein dimethyl terephthalate is reacted with ethylene glycol.

3. The process of claim 1 wherein the divalent antimonite is cadmium antimonite.

4. The process of claim 1 wherein the divalent antimonite is tin antimonite.

5. The process of claim 1 wherein the divalent antimonite is lead antimonite.

6. The process of claim 1 wherein the divalent antimonite is magnesium antimonite.

7. The process of claim 1 wherein the divalent antimonite is manganese antimonite.

References Cited in the file of this patent

UNITED STATES PATENTS

| | | |
|---|---|---|
| 2,739,957 | Billica et al. | Mar. 27, 1956 |
| 2,951,060 | Billica | Aug. 30, 1960 |

FOREIGN PATENTS

| | | |
|---|---|---|
| 799,334 | Great Britain | Aug. 6, 1958 |